INVENTOR
W. N. TOY
BY Lucian C. Canepa
ATTORNEY

| TRANSLATOR GATE NO. (A OR B) | INPUTS TO TRANSLATOR GATES | |
|---|---|---|
| | EVEN | ODD |
| 12 | 0000 | |
| 13 | | 0001 |
| 14 | | 0010 |
| 15 | 0011 | |
| 16 | | 0100 |
| 17 | 0101 | |
| 18 | 0110 | |
| 19 | | 0111 |
| 20 | | 1000 |
| 21 | 1001 | |
| 22 | 1010 | |
| 23 | | 1011 |
| 24 | 1100 | |
| 25 | | 1101 |
| 26 | | 1110 |
| 27 | 1111 | |

United States Patent Office 3,428,945

Patented Feb. 18, 1969

3,428,945
ERROR DETECTION CIRCUITS

Wing N. Toy, Colts Neck, N.J., assignor to Bell Telephone Laboratories, Incorporated, New York, N.Y., a corporation of New York Filed May 20, 1965, Ser. No. 457,406
U.S. Cl. 340—146.1 8 Claims
Int. Cl. G08c 25/00

ABSTRACT OF THE DISCLOSURE

Circuits are respectively connected to various types of N-crosspoint translation arrays to detect and indicate the occurrence of double outputs from the arrays. Each such circuit includes two error-detecting gates each connected in a selected manner to N/2 different crosspoints of the associated array. For one general type of array, all single-fault occurrences in the crosspoints themselves are automatically detected by the error-detecting gates during actual operation of the array. For another general type of array, many double-output error occurrences therefrom are detected by the gates during actual operation of the array but a complete check of the condition of the crosspoints is carried out during a test cycle of operation. For both types of arrays, the error-detecting and indicating circuits themselves are also checked during a test cycle of operation.

This invention relates to signal translating arrangements and, more particularly, to a circuit for detecting the occurrence of errors in a translation system.

Systems which include a matrix arranged for translating a digital representation into an output indication in which one and only one at a time of a plurality of output conductors is energized, are well known in the information processing art. Such systems are used therein to perform a variety of functions. One typical such use is in the program translator unit of a digital computer wherein each command or instruction of a program is translated from a binary number to a one-out-of-N output indication. In turn, the output signal activates associated control circuitry that actually implements the translated command.

Under normal operating conditions, typical computing systems require that only one program command be executed at a time. If, however, the program translator unit of such a system produces two simultaneous output indications, one additional extraneous command will be implemented. Such double outputs can seriously affect the over-all operation of the computer and produce erroneous results therefrom that are not easily detectable.

An object of the present invention is the improvement of signal translating arrangements.

More specifically, an object of this invention is the detection in a relatively simple and reliable manner of erroneous double output signals which occur in binary to one-out-of-N translators.

These and other objects of the present invention are realized in a specific illustrative embodiment thereof that includes an error-detecting circuit having N input terminals respectively connected in a selected manner to N crosspoint units of an associated binary to one-out-of-N translating array. The array is of a type in which double outputs when they occur will most likely emanate from the crosspoint units disposed along a selected row or column.

Illustratively, the coordinate matrix array with which the specific embodiment is associated includes $2^n$ rows and $2^n$ columns which define at their intersections the locations of the N (or $2^{2n}$) crosspoint units. Selection of a particular one of the crosspoint units is accomplished by applying a corresponding unique one of $2^{2n}$ $2n$-digit binary numbers to the translation array.

The error-detecting circuit associated with the array comprises two input gates each having $2^{2n}/2$ (or N/2) input terminals that are respectively connected to the output terminals of a different one of two sets of crosspoint units. In particular, one set of crosspoint units includes all those units that are selected in response to the application to the array of binary representations that include an even number of "1" indications. The other set includes all the remaining crosspoint units, which are respectively selected in response to applied binary numbers each having an odd number of "1" representations therein.

In accordance with the principles of the present invention, the noted crosspoint units and the associated error-detecting circuit may be combined with X and Y pretranslators from each of which extend $2^n$ conductors definitive of the coordinate matrix array. In this case, referred to below as case No. 1, each crosspoint unit includes two input terminals and one output terminal. Alternatively, two-rail binary representations may be applied directly from input flip-flop circuits to the crosspoint units of the translation array. In this case, referred to below as case No. 2, each row and column of the array includes $n$ conductors and each crosspoint unit comprises $2n$ input terminals and one output terminal.

As a result of the described pattern of interconnections between the error-detecting gates and the output terminals of the crosspoint units, all single faults which occur in the pretranslators of the case No. 1 configuration, and which cause double output indications during actual operation of the translation array, are detected by the two error-detecting gates. Moreover, many double output errors which arise from single faults in the crosspoint gate units themselves are detected by the error-detecting gates during actual operation of the array. A complete check of the condition of the crosspoint gate units is carried out during a test cycle of operation, whereby all crosspoint gate units are then checked for faults.

In the translation configuration that corresponds to case No. 2, all single faults in the crosspoint gate units are automatically detected by the two error-detecting gates during actual operation of the array.

It is a feature of the present invention that an error-detecting circuit which is adapted to be connected to an N-crosspoint translation array include two error-detecting gates each connected in a selected manner to $N/2$ different crosspoints of the array.

It is another feature of such an error-detecting circuit that one gate thereof be connected to all those crosspoints which are respectively selected by binary representations that include an even number of "1" indications and that the other gate thereof be connected to all those crosspoints which are respectively selected by binary numbers that include an odd number of "1" indications therein.

A complete understanding of the present invention and of the above and other features and advantages thereof may be gained from a consideration of the following detailed description of an illustrative embodiment thereof presented hereinbelow in connection with the accompanying drawing, in which.

Figure 3A:
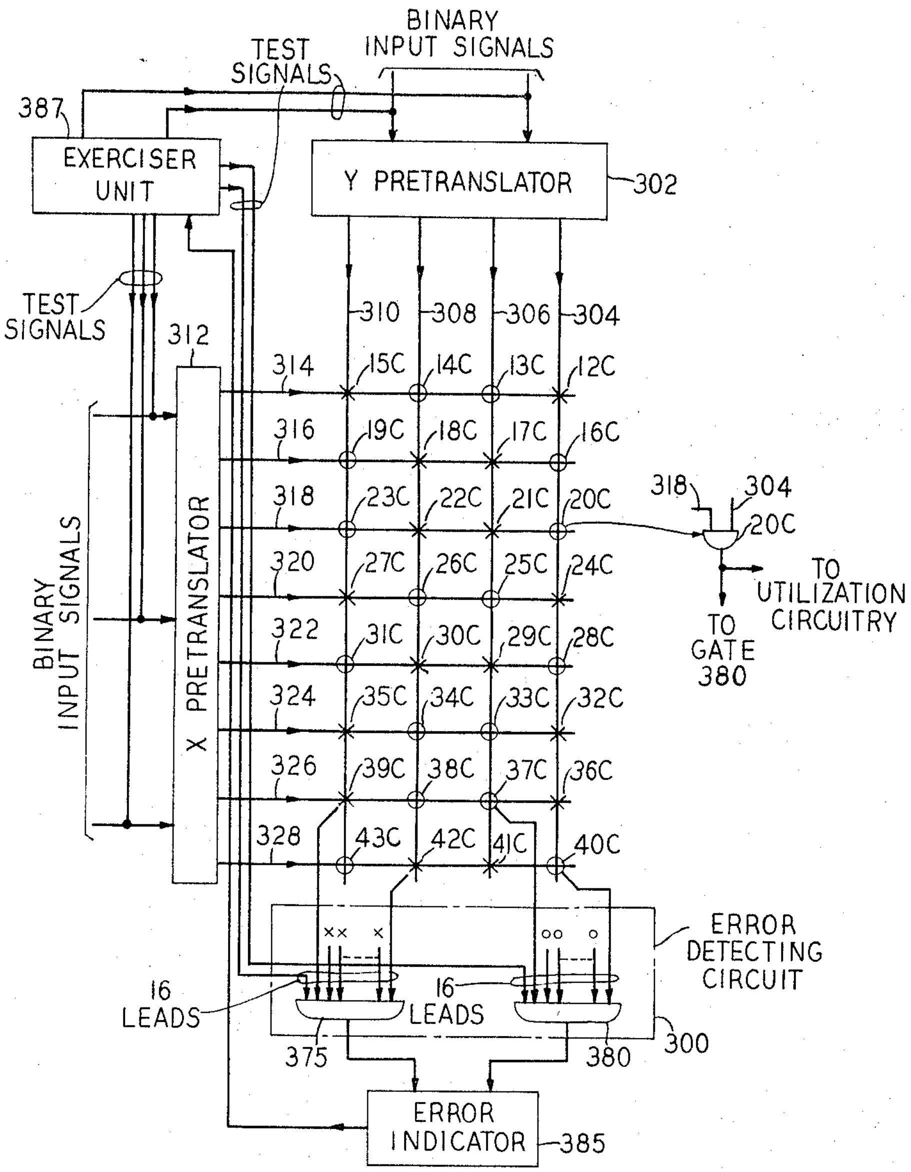
FIG. 3A shows a 4 x 8 rectangular matrix array with associated pretranslators and illustrates the manner in which an error-detecting circuit made in accordance with the principles of the present invention is interconnected therewith.
Figure 3B:
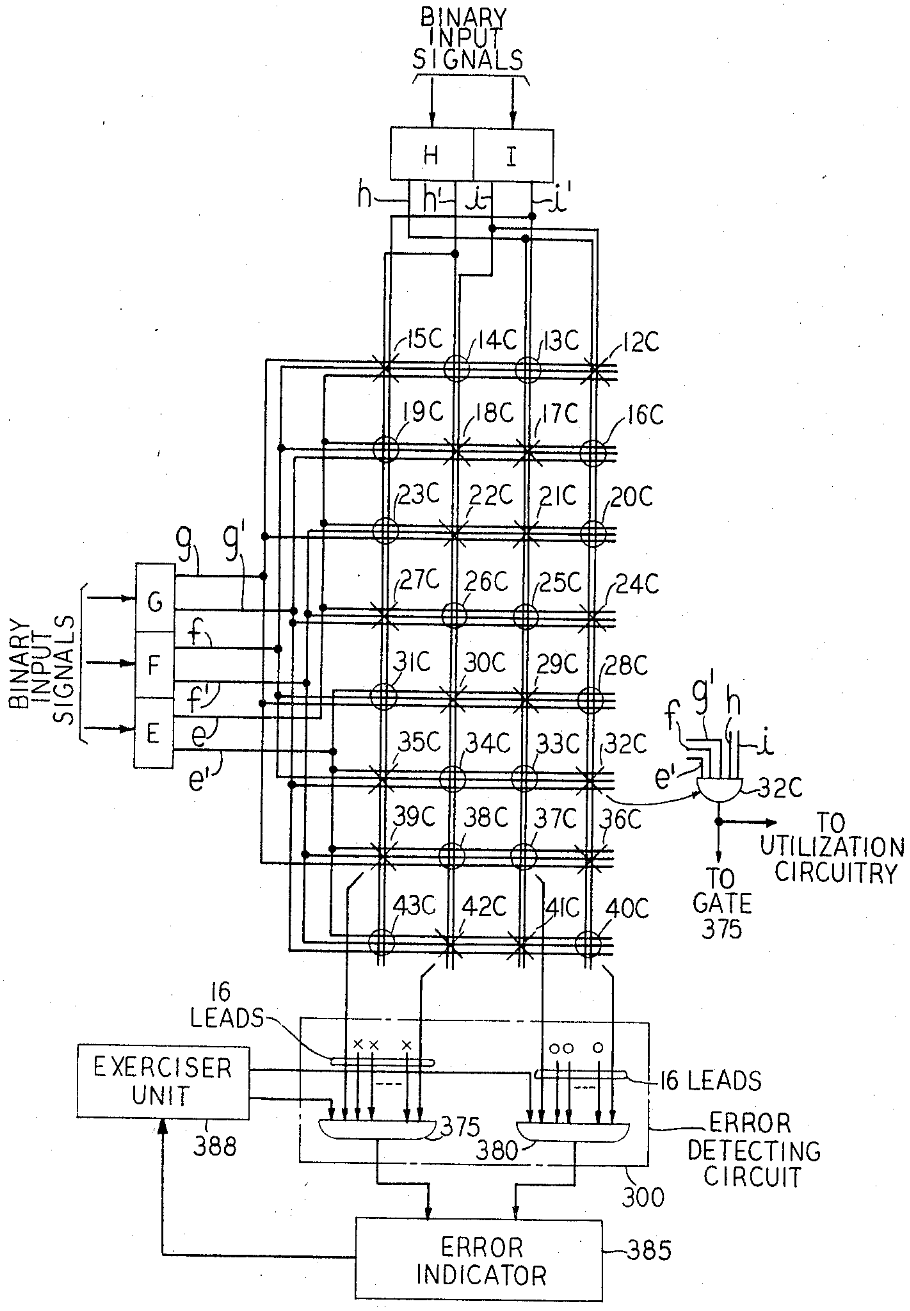

FIG. 3B illustrates a 4 x 8 rectangular array which receives its inputs in two-rail binary fashion directly from associated flip-flops and, in addition, shows the manner in which an error-detecting embodiment of the principles of this invention is interconnected with such an array; and FIGS. 4 and 4A through 4D depict the manner in which another illustrative embodiment of the principles of this invention is interconnected with a 4 x 4 x 4 cubic translation array.

Figure 1:
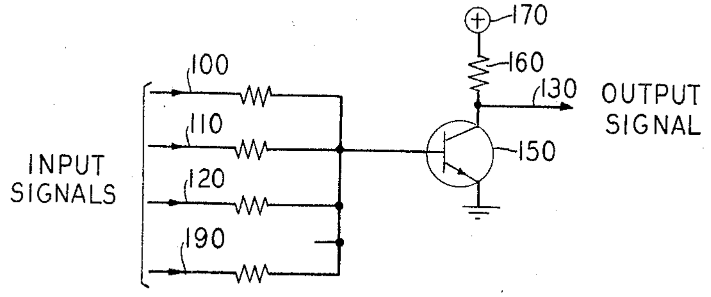
FIG. 1 is a schematic depiction of one particular type of basic logic circuit out of which a translation array and an associated error-detecting circuit made in accordance with the principles of the present invention may be constructed.

Before proceeding to a detailed description of the present invention, it will be helpful to describe one illustrative type of logic circuit out of which the specific error-detecting circuit described hereinbelow may advantageously be constructed. FIG. 1 shows such a circuit. The arrangement shown in FIG. 1 is the basic circuit of the logic technology known as transistor resistor logic (TRL). A general description of TRL circuits may be obtained by referring to an article entitled "Transistor NOR Circuit Design" by W. D. Rowe and G. H. Royer in volume 76, part I, of the Transactions of the American Institute of Electrical Engineers, Communications and Electronics, July 1957, pages 263–267.

The logic circuit shown in FIG. 1 includes four leads 100, 110, 120 . . . 190 to which may be applied selected input signals to produce on a lead 130 an output signal which is a predetermined logical function of the inputs. The circuit also includes an n-p-n transistor 150, a collector bias resistor 160 and a positive source 170 of direct-current power.

If a voltage near ground potential is applied to every one of the input leads 100, 110, 120 . . . 190 shown in FIG. 1, the transistor 150 is in its nonconducting state and the potential of the output lead 130 is, as a result, positive with respect to ground. On the other hand, if a positive potential is applied to any one or more of the input leads 100, 110, 120 . . . 190, the transistor 150 is energized and the output conductor 130 is then near ground potential.

Thus, for example, if a positive signal is applied to the input lead 100 and a signal near ground is applied to every other one of the input leads shown in FIG. 1, the potential of the output lead 130 is near ground. Assume, however, that due to a faulty connector or other malfunction such as an open resistor the input lead 100 is in effect broken, i.e., becomes open-circuited. The result of such a fault is that the depicted logic circuit does not function in its intended manner. In particular, the circuit would under the assumed circumstances provide a positive rather than a ground output signal. In practice this type of malfunction is one of the most common to occur and one of the most difficult to detect. The specific illustrative embodiments described herein are adapted to detect such occurrences.

Figure 2A:
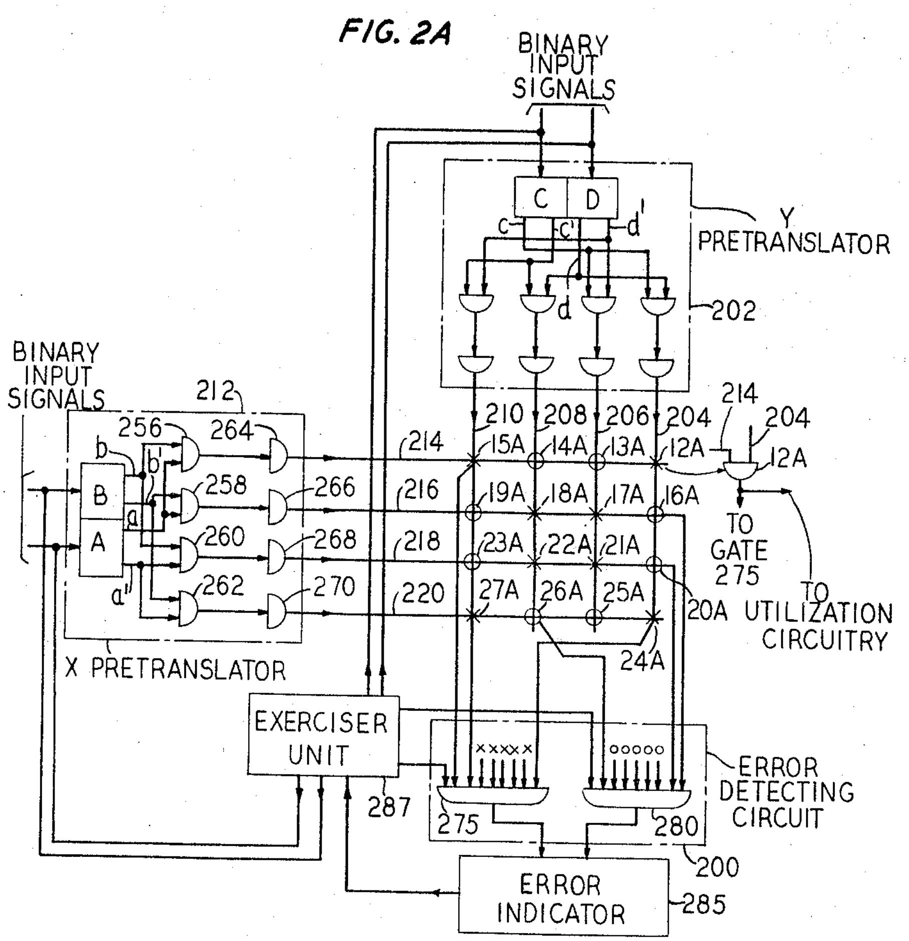
FIG. 2A shows the manner in which a specific illustrative error-detecting circuit made in accordance with this invention is interconnected with a 4 x 4 matrix array that receives its inputs from two associated pretranslator units.

FIG. 2A shows a translation matrix associated with an error-detecting circuit 200 which is made in accordance with the principles of the present invention. The matrix array includes a conventional Y pretranslator 202 for converting a 2-digit input binary representation into an energization of one and only one of four output leads 204, 206, 208 and 210 emanating from the pretranslator 202. Additionally, the arrangement includes a conventional X pretranslator 212 for converting a 2-digit input binary number into an energization of one and only one of four output leads 214, 216, 218 and 220.

Illustratively, the Y pretranslator 202 responds to the application thereto of the input signal representations 00, 01, 10 and 11 by energizing the leads 204, 206, 208 and 210, respectively. Similarly, the X pretranslator 212 may be considered to activate the output leads 214, 216, 218 and 220 in response to the input representations 00, 01, 10 and 11, respectively.

The two sets of leads extending from the Y and X pretranslators 202 and 212 form 16 intersections which are arranged in four rows and four columns of a matrix array. Connected to each of the 16 intersections of the array is a distinct two-input crosspoint unit or logic circuit of the general type shown in FIG. 1. (Each of these circuits is symbolically represented in FIG. 2A by an X or an O.) Thus, for example, as shown in more detail on the right side of FIG. 2A, the upper right-hand two-input logic circuit 12A included in the matrix array has one of its input terminals connected to the lead 204 and its other input terminal connected to the lead 214. The other 15 logic circuits 13A through 27A are connected in a similar manner to the output leads of the Y and X pretranslators. The 16 output leads emanating from these 16 logic circuits 12A through 27A are considered to be the main output leads of the herein-considered translation array.

Assume that the binary representation 10 is applied as an input to each of the Y and X pretranslators 202 and 212 shown in FIG. 2A. In response thereto the leads 208 and 218 are grounded. As a result the logic circuit 22A having its input terminals respectively connected to these leads is selected, thereby causing a positive signal to appear on the output lead of that particular circuit. In accordance with the mode of operation of the depicted translation array, all other nonselected crosspoint units should continue to provide near-ground potential output signals.

Assume further, however, that a fault occurs in the logic circuit 14A whose input terminals are connected to the leads 208 and 214. In particular, assume that somehow a break develops in the immediate vicinity of the circuit 14A in the wire that connects the lead 214 to one input terminal of the circuit 14A. In effect then the circuit 14A is converted into a one-input crosspoint unit. Therefore, the above-assumed grounding of the lead 208 by the Y pretranslator 202 causes the output of the logic circuit 14A to be also energized, which causes the translator array to provide two rather than only one positive output signals on the main output leads thereof. This is the type of fault condition and consequent erroneous output that the present invention is designed to detect.

Each of the 16 crosspoint gate units 12A through 27A represented in FIG. 2A is selected (that is, made to provide a positive output signal) in response to a unique 4-digit input binary representation applied thereto. Thus, for example, as mentioned above, the unit 12A is selected in response to the grounding of the leads 204 and 214, which in turn stems from the application of the binary signals 00 and 00 to the Y and X pretranslators 202 and 212, respectively. In other words, the binary number 0000 can be regarded as uniquely selective of the crosspoint gate unit 12A. This correspondence between the gate 12A and the input representation 0000 is indicated in the first line of the table of FIG. 2C. Also shown in the table are the 15 4-digit binary numbers respectively associated with the other gate units 13A through 27A of the matrix array depicted in FIG. 2A.

Before proceeding to a detailed description of the error-detecting circuit 200 and of the manner in which the circuit 200 is interconnected with the 16 crosspoint units 12A through 27A shown in FIG. 2A, let us consider the arrangement of the X and Y pretranslators 202 and 212.

The pretranslators 202 and 212 may, for example, be identical to each other and each take the form illustrated by the pretranslator 212. The unit 212 includes two flip-flops A and B each having two-rail outputs which are applied in the specific manner shown in FIG. 2A to four gate circuits 256, 258, 260 and 262 whose respective outputs are applied via four inverter circuits 264, 266, 268 and 270 to the above-mentioned matrix-forming leads 214, 216, 218 and 220. Advantageously, each of the gate and inverter circuits included in the pretranslators 202 and 212 is of the general type described above and shown in FIG. 1.

If the upper flip-flop B illustrated in FIG. 2A is in its "1" state, its upper output lead *b* may be considered to be at a positive potential and its lower output lead *b'* may be considered to be near ground potential. Similarly, if the lower flip-flop A is also in its "1" state, its upper and lower output leads *a* and *a'* are positive and near ground, respectively. As a result of these assumed conditions (which are representative of the input word 11 being applied to the pretranslator 212) the inverter circuit 270 provides a near-ground output signal on the lead 220, whereas each of the outer inverter circuits 264, 266 and 268 provides a positive output signal.

The ground signal assumed above to be present on the lead 220 of the X pretranslator 212 shown in FIG. 2A is applied to one input terminal of the crosspoint unit 24A whose other input terminal is connected to the lead 204 emanating from the Y pretranslator 202. Assume that the lead 204 is the only one of the leads from the pretranslator 202 which has a ground signal applied thereto. (This condition results from the application of the binary representation 00 to the pretranslator 202). As a result, the crosspoint unit 24A provides a positive signal on its main output lead. If the translation array shown in FIG. 2A is operating correctly, the unit 24A is the only one of the 16 crosspoint units included therein which provides such an output signal. This single output signal from the crosspoint array resulted from the application to the X and Y pretranslators 212 and 202 of the 4-digit binary representation 1100, as indicated in the fourth-from-the-bottom row of the table shown in FIG. 2C.

In accordance with the principles of the present invention the 16 output leads emanating from the 16 crosspoint gate units of the 4 x 4 matrix array represented in FIG. 2A are connected in a selected manner to two 8-input error-detecting gate units 275 and 280 included in the error-detecting circuit 200. In particular, the output leads of those crosspoint units which are selected by input binary numbers which include an even number of "1" indications are connected to the error-detecting gate unit 275. ("Even" herein will be assumed to also include the number 0000 or, more generally, any $2n$-digit binary number composed entirely of zeros.) Each of the crosspoint units connected to the error-detecting unit 275 is designated in FIG. 2A by an X. There are eight such X-designated crosspoint units. However, in the interest of not unduly cluttering the FIG. 2A depiction, only three of the eight wires that extend from the eight X-designated crosspoint units to the gate unit 275 are shown in the drawing. It is to be understood that an additional five wires actually extend from the X-designated crosspoint units to the five X-leads extending into the gate unit 275.

It is apparent from FIG. 2A that the X-designated crosspoint units comprise the units 12A, 15A, 17A, 18A, 21A, 22A, 24A and 27A. In addition, it is seen from FIG. 2C that the input representations corresponding to these eight specified units are included in the column headed "even."

The remaining eight crosspoint units of the FIG. 2A array, namely, the units 13A, 14A, 16A, 19A, 20A, 23A, 25A and 26A, are each designated by a O. The output terminals of these eight O-designated units are connected to a second error-detecting gate unit 280, although only three such interconnections are actually shown in the drawing. The remaining five such interconnections extend between the O-designated units 13A, 14A, 19A, 23A and 25A and the O-leads extending into the gate unit 280. Each of these O-designated units is selected in response to the application to the Y and X pretranslators 202 and 212 of a binary representation that includes an odd number of "1" indications therein. This is apparent from FIG. 2C wherein the input representations corresponding to the eight O-designated units are included in the column headed "odd."

To illustrate the error-detecting capabilities of FIG. 2A arrangement, assume that somehow a break develops in the lead which extends to the lower input terminal of the gate unit 260 included in the X pretranslator 212. In effect then the unit 260 is converted into a one-input gate whose single input is derived from the lead marked *b*. Assume further that the input representations 00 and 00 are respectively applied to the Y and X pretranslators 202 and 212. In response thereto the pretranslator output leads 204 and 214 are grounded and as a result the crosspoint gate unit 12A is selected. However, the single input from the lead *b* to the faulty gate unit 260 is a near-ground signal which causes the output of the unit 260 to be positive and the output of the associated inverter unit 268 to be a near-ground signal. Consequently, the output lead 218 of the X pretranslator 212 is also selected or grounded. Therefore, the crosspoint unit 20A connected to the intersecting conductors 204 and 218 is also selected in response to the herein-assumed fault condition. In the absence of error-detecting circuitry associated with the depicted matrix translation array, an erroneous double output of the type described above would very likely go undetected.

However, as indicated in FIG. 2A, the output lead of the selected crosspoint gate unit 12A is connected to the error-detecting gate 275, whereas the output lead of the erroneously-selected crosspoint gate unit 20A is connected to the error-detecting gate 280. Hence, for the assumed fault condition, both of the gates 275 and 280 provide near-ground output signals to an associated error indicator 285 which may, for example, be an array of lamps or alarms, or an AND circuit, or any other suitable apparatus capable of indicating that the outputs of the gates 275 and 280 are both near ground.

If any other one of the input leads to one of the two-input gate units included in the pretranslators 202 and 212 of FIG. 2A is broken, multiple translator outputs of the type described above would occur. However, every such error occurrence is detected in a positive manner by the circuit 200 and indicated by the unit 285.

Moreover, the specific illustrative error-detecting arrangement shown in FIG. 2A is capable of detecting many errors which arise from faults in the crosspoint gate units 12A through 27A. A typical such fault comprises a broken input connection to one of the crosspoint units in a selected row or column. Assume, for example, that an open circuit develops in one of the input resistors of the crosspoint gate unit 17A. Specifically, assume that such a fault develops in the input resistor thereof that is connected to the vertically-extending input lead 206. Then grounding of the pretranslator output leads 204 and 216 to select the crosspoint unit 16A would also cause the unit 17A to provide a positive output signal indicative of its selection. But, since the output leads of the crosspoint units 16A and 17A extend to different ones of the two error-detecting gates 275 and 280, both of the gates 275 and 280 would provide near-ground signals to the indicator 285 which, in turn, would supply a suitable error occurrence signal.

Many other double outputs stemming from faults in the crosspoint gate units 12A through 27A of FIG. 2A are automatically detected, during actual operation of the array, by the novel error-detecting circuitry described herein. In general, whenever the output leads of two crosspoint units respectively extend to the two error-detecting gates 275 and 280, an erraneous double output condition therefrom is detected. However, some double output occurrences are not automatically detected during actual operation of the depicted array. For example, if both of the crosspoint units 17A and 21A are selected due to a fault in one of these units, only the error-detecting gate unit 275 would have positive signals applied thereto from the array. Hence, in this case the outputs of the units 275 and 280 are different and, accordingly, no indication of an error occurrence is provided by the unit 285. Whenever both selected crosspoint units are O-designated ones (or X-designated ones) no indication of an error occurrence is provided.

To guard against an undetected fault condition in one of the crosspoint gate units 12A through 27A of the FIG. 2A array, it is advantageous periodically to test the depicted array. This testing may be accomplished by an exerciser unit 287 which is adapted or programmed to apply a predetermined set of test input signals to the Y and X pretranslators 202 and 212. These test signals are selected to sequentially energize a set of four X-designated crosspoint units representative of every row and column of the matrix array. Such a set is exemplified by the units 12A, 17A, 22A and 27A, which are disposed along one main diagonal of the depicted array. Then additional test signals are applied to the array from the exerciser unit 287 to sequentially energize a selected set of four O-designated crosspoint units also representative of every row and column of the array. The units 14A, 19A, 20A and 25A comprise one such set.

In accordance with the test cycle of operation described above, a complete check of the crosspoint gate units 12A through 27A is performed. Any double outputs therefrom are detected in an unequivocal manner by the circuit 200 and indicated by the unit 285.

Additionally, periodic testing of the error-detecting circuit 200 to ensure correct operation thereof is considered advantageous. For this purpose an extra input terminal is added to each of the gate units 275 and 280. As shown in FIG. 2A, these terminals are connected to the exerciser unit 287, which is adapted to apply test signals to the gates 275 and 280 and to monitor the resulting output condition of the error indicator 285, thereby to test the error-detecting portion of the illustrated arrangement for proper response to single and multiple input signals applied thereto.

Figures 2B, 2C:
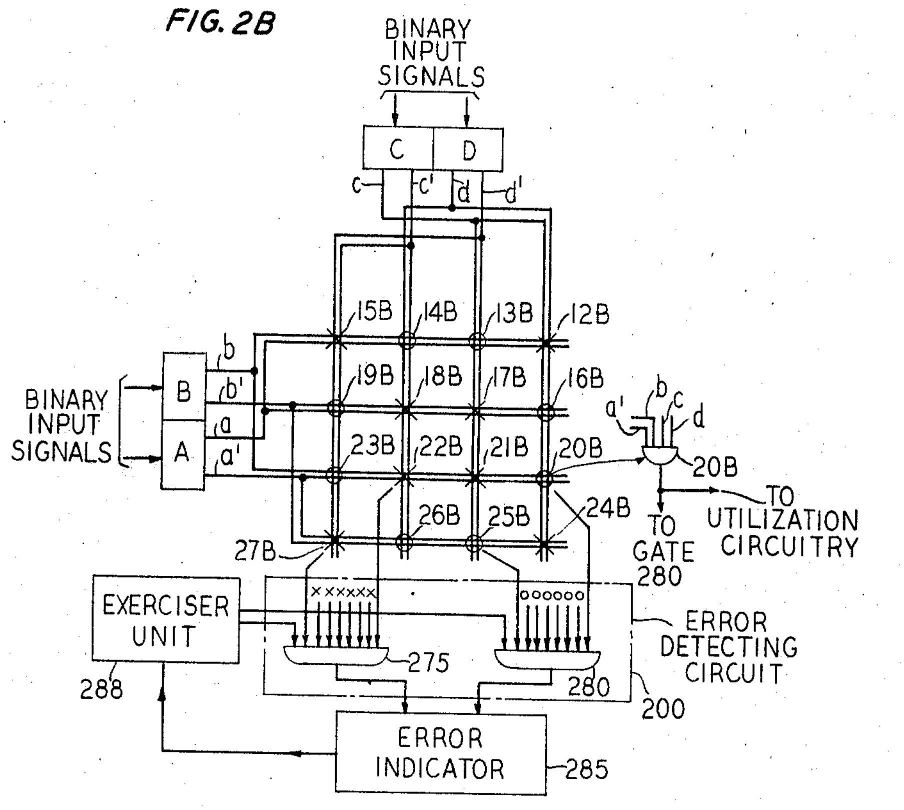
FIG. 2B depicts the manner in which an illustrative embodiment of this invention is interconnected with a 4 x 4 matrix array that receives its inputs in two-rail fashion directly from associated flip-flop circuits.
FIG. 2C is a tabular listing of the 16 crosspoint gates shown in FIGS. 2A and 2B and specifies the corresponding input binary numbers by means of which the gates are respectively selected.

The principles of the present invention also extend to the detection of errors in translation arrays which receive their input signals directly from associated flip-flops rather than from pretranslators of the type shown in FIG. 2A. Such an alternative arrangement is shown in FIG. 2B wherein flip-flops A, B, C and D supply two-rail binary input signals directly to 16 4-input crosspoint gate units 12B through 27B which are arranged in a 4 x 4 matrix array. For illustrative purposes, one crosspoint gate unit 20B is shown on the right side of FIG. 2B. The unit 20B is represented as having input signals applied thereto from the flip-flop output leads designated *a'*, *b*, *c* and *d*. The inputs applied to each of the other crosspoint units can easily be determined by inspection of the specific wiring pattern shown in FIG. 2B.

The table of FIG. 2C was described above in connection with FIG. 2A. However, this table is also applicable to the arrangement shown in FIG. 2B. Thus, for example, to determine which 4-digit input binary representation will result in the selection of the crosspoint gate unit 27B of FIG. 2B, reference can be made to the last row of FIG. 2C. As indicated there, the input representation 1111 causes the unit 27B to be selected. The corresponding input representations for the other 15 crosspoint units of FIG. 2B are also listed in the table of FIG. 2C. Thus, the spatial arrangement of the crosspoint units of FIG. 2B which are selected in response to binary numbers having an even (or odd) number of "1" signals therein is identical to that illustrated in FIG. 2A. Hence, the arrangement and significance of the X's and O's in FIGS. 2A and 2B is the same.

Moreover, the pattern of connections between the output leads of the crosspoint units 12B through 27B of FIG. 2B and two associated error-detecting gates 275 and 280 (included in an error-detecting circuit 200) is identical to that described above in connection with FIG. 2A. Specifically, the following X-designated crosspoint units are connected to the error-detecting gate unit 275: 12B, 15B, 17B, 18B, 21B, 22B, 24B and 27B. In addition, the following O-designated units are connected to the gate unit 280: 13B, 14B, 16B, 19B, 20B, 23B, 25B and 26B. In turn, the outputs of the gates 275 and 280 are applied to an associated error indicator 285 which may be identical to the unit 285 described earlier in connection with FIG. 2A.

The circuitry shown in FIG. 2B also includes an exerciser unit 288. Advantageously, signals are applied periodically from the unit 288 to the gates 275 and 280 to test the response thereof to single and multiple inputs, in a manner similar to that described above in connection with the testing of the gates 275 and 280 of FIG. 2A.

In accordance with the principles of the present invention the error-detecting circuit 200 shown in FIG. 2B is capable of detecting multiple outputs from the crosspoint units of the associated translation array during actual operation of the array. More specifically, any single input fault occurrence in the crosspoint units is automatically detected during actual operation of the depicted apparatus. No separate test cycle of operation thereof is required to perform a complete check on the condition of the 16 crosspoint units.

The unique error-detecting capabilities of the circuitry shown in FIG. 2B can be demonstrated by assuming various fault conditions and observing the response thereto of the error-detecting circuit 200. For example, assume that the upper horizontal input lead that extends to the designated crosspoint unit 17B breaks in the intermediate vicinity of the unit 17B, the other connections from that horizontal lead to the units 16B, 18B and 19B remaining intact. As a result of this fault condition, the crosspoint unit 17B is in effect converted into a 3-input gate having inputs applied thereto from the flip-flop output leads designated *a*, *c* and *d'*. Consequently, the unit 17B is selected to provide a positive output signal in response to either one of the input binary representations 0101 and 0001. As indicated in the table of FIG. 2C, the representation 0101 is uniquely associated with the unit 17B. However, the indication 0001 is the input pattern for selection of the O-designated crosspoint unit 13B. Thus, in response to this latter input representation, both of the units 13B and 17B are selected to supply positive signals to the error-detecting circuit 200. One of these signals, namely, the one from the unit 13B, is applied to the gate 280, whereas the signal from the unit 17B is applied to the gate 275. Hence, the circuit 200 supplies to the error unit 285 two near-ground signals, thereby to indicate in a positive manner the occurrence of an erroneous multiple output condition.

For any other single input fault occurrence in the crosspoint units 12B through 27B of FIG. 2B, it can easily be verified by a process identical to that specified above that in every case of multiple outputs two positive signals are respectively applied from the crosspoint units to the error-detecting gates 275 and 280 to energize the error indicator 285. In every such case, one output stems from an O-designated crosspoint unit and the other stems from an X-designated unit. Thus, it is apparent that the arrangement shown in FIG. 2B is self-checking during actual operation of the array for all single input fault occurrences in the noted crosspoint units.

The principles of the present invention are not limited in their application to square matrices but extend also to rectangular matrix arrays such as those shown by way of illustration in FIGS. 3A and 3B. The FIG. 3A arrangement includes Y and X pretranslators 302 and 312, respectively, for applying input signals to a 4 x 8 array of crosspoint units and is generally similar in its error-detecting capabilities to the square matrix shown in FIG. 2A. On the other hand, the FIG. 3B arrangement includes flip-flops E, F, G, H and I for applying two-rail binary input signals directly to a 4 x 8 array, and is generally similar in its error-detecting capabilities to the square matrix of FIG. 2B.

In accordance with the principles of this invention, the pattern of interconnections shown in FIGS. 3A and 3B between the 32 crosspoint units 12C through 43C and two associated error-detecting gates 375 and 380 is identical to that described above in connection with FIGS. 2A and 2B. Specifically, the output lead of each crosspoint unit that is selected in response to an input binary number that includes an even number of "1" signal indications is connected to the gate unit 375 included in an error-detecting circuit 300. On the other hand, the output lead of every crosspoint unit that is selected in response to an input binary number that includes an odd number of "1" signal indications is connected to the gate unit 380 in the circuit 300. Every even-selected crosspoint gate unit is represented in FIGS. 3A and 3B by an X, and every odd-selected unit is represented therein by an O.

Illustratively, the Y pretranslator 302 shown in FIG. 3A responds to the application thereto of the input signal representations 00, 01, 10 and 11 by energizing (grounding) its output leads 304, 306, 308 and 310, respectively. The X pretranslator 312 may be considered to activate its output leads 314, 316, 318, 320, 322, 324, 326 and 328 in response to the application thereto of the input representations 000, 001, 010, 011, 100, 101, 110 and 111, respectively. Thus, for example, if the 3-digit representation 111 is applied to the X pretranslator 312 and if the 2-digit representation 00 is applied to the Y pretranslator 302, the resulting 5-digit input pattern 11100 is effective to select the particular crosspoint gate unit connected to the intersection of the two conductors 304 and 328. This particular unit, designated 40C, has its output lead connected to the error-detecting gate 380 (because the representation 11100 includes an odd number of "1" indications).

Each of the Y and X pretranslators 302 and 312 shown in FIG. 3A may comprise flip-flops, two-input gate circuits and inverter circuits interconnected according to the pattern illustrated by the units included in the pretranslators 202 and 212 of FIG. 2A. The error control capabilities of such an arrangement extend to the automatic detection of any single fault in one of the two-input gate circuits of the pretranslators. The detection of such faults takes place during actual operation of the array. Moreover, many single input fault conditions in the crosspoint gate units 12C through 43C are automatically detected during actual operation thereof. Thus, for example, in a manner essentially identical to that described in detail above in connection with FIG. 2A, the occurrence of multiple outputs from, say, the crosspoint units 29C and 33C, would be detected by the gates 375 and 380 and the indicator 385 in the error-detecting circuit 300.

However, the fault indicating capabilities of the arrangement shown in FIG. 3A are not self-detecting for all error occurrences therein. For instance, multiple outputs from the crosspoint gate units 35C and 39C would go undetected during actual operation. To completely test the crosspoint units 12C through 43C for faults, it is advantageous to periodically and systematically check their condition during a test cycle of operation. This testing may be accomplished by an exerciser unit 387 which is adapted to apply a predetermined set of test input signals to the Y and X pretranslators 302 and 312. These test signals are selected to sequentially energize a set of eight X-designated crosspoint units representative of every row and column of the matrix array. Such a set is exemplified by the units 12C, 17C, 22C, 27C, 30C, 35C, 36C and 41C. Then additional test signals are applied to the array from the exerciser unit 387 to sequentially energize a set of eight O-designated crosspoint units representative of every row and column of the array. The units 14C, 19C, 20C, 25C, 28C, 33C, 38C and 43C comprise one such set.

In accordance with the test cycle of operation described above, a complete check of the crosspoint gate units 12C through 43C is performed. Any double outputs therefrom are detected in an unequivocal manner by the circuit 300 and indicated by the unit 385.

Additionally, periodic testing of the error-detecting circuit 300 shown in FIG. 3A to ensure correct operation thereof is considered advantageous. For this purpose an extra input terminal is added to each of the gate units 375 and 380. As shown in FIG. 3A, these terminals are connected to the exerciser unit 387 which is adapted to apply test signals to the units 375 and 380 and to monitor the resulting output condition of the error indicator 385, thereby to test the error-detecting portion of the illustrated arrangement for proper response to single and multiple input signals applied thereto.

FIG. 3B depicts a variant of FIG. 3A. In the FIG. 3B array two-rail binary signals are applied directly from five input flip-flops E, F, G, H and I to a matrix of 32 crosspoint units 12C through 43C. The inputs applied to each of the illustrated crosspoint units can easily be determined by inspection of the specific wiring pattern shown in FIG. 3B. For example, the inputs to the crosspoint unit 12C are seen to be derived from the flip-flop output leads designated *e, f, g, h* and *i*. In accordance with the flip-flop output signal convention described above in connection with FIG. 2B, this pattern of connections signifies that whenever the five flip-flops E, F, G, H and I are in their respective "0" states, five near-ground signals are applied to the unit 12C, whereby the unit 12C then provides a positive output signal to associated utilization circuitry (not shown) and to the error-detecting gate 375.

In accordance with the principles of the present invention, the error-detecting circuit 300 shown in FIG. 3B is capable of detecting multiple outputs from the crosspoint units of the associated translation array during actual operation of the array. In other words, any single input fault occurrence in the crosspoint units is automatically detected during operation of the apparatus. No separate test cycle of operation is required to perform a complete check on the condition of the 32 crosspoint units. This powerful, self-detecting capability of the FIG. 3B arrangement is similar to that described above as being characteristic of the FIG. 2B circuitry.

The error-detecting capabilities of the FIG. 3B arrangement can be demonstrated by assuming various fault conditions and observing the response thereto of the error-detecting circuit 300. For example, assume that the uppermost horizontal input lead that extends to the O-designated crosspoint unit 25C breaks in the immediate vicinity of the unit 25C. As a result of this fault condition, the unit 25C is in effect converted into a 4-input gate having inputs supplied thereto from the flip-flop output leads designated *f'*, *g'*, *h* and *i'*. Consequently, the unit 25C is selected to provide a positive output signal in response to either one of the 5-digit binary representations 01101 and 11101. The representation 01101 is uniquely associated with the unit 25C. However, the indication 11101 is the input pattern that selects the X-designated crosspoint unit 41C. Thus, in response to this latter input representation both of the units 25C and 41C are selected to supply positive signals to the error-detecting circuit 300. One of these signals, namely, the one from the unit 25C, is applied to the gate 380, whereas the signal derived from the unit 41C is applied to the gate 375. Hence, the circuit 300 supplies to the error unit 385 two near-ground signals, thereby to indicate in a positive manner the occurrence of an erroneous double output condition.

For any other single fault occurrence in the crosspoint units 12C through 43C of FIG. 3B, it can easily be verified that in every case of double outputs two positive signals are respectively applied from two crosspoint units to the error-detecting gates 375 and 380 to energize the error indicator 385. In every such case one output stems from an O-designated crosspoint unit and the other stems from an X-designated unit. Thus, it is apparent that the arrangement shown in FIG. 3B is self-checking, during actual operation of the translation array, for all single input fault occurrences in the noted crosspoint units.

The circuitry shown in FIG. 3B also includes an exerciser unit 388. Advantageously, signals are applied periodically from the unit 388 to the gates 375 and 380 to test the response thereof to single and multiple input signals, in a manner similar to that described above in connection with the testing of the error-detecting gates included in FIGS. 2A, 2B and 3A.

Figures 4, 4A, 4B, 4C, 4D:
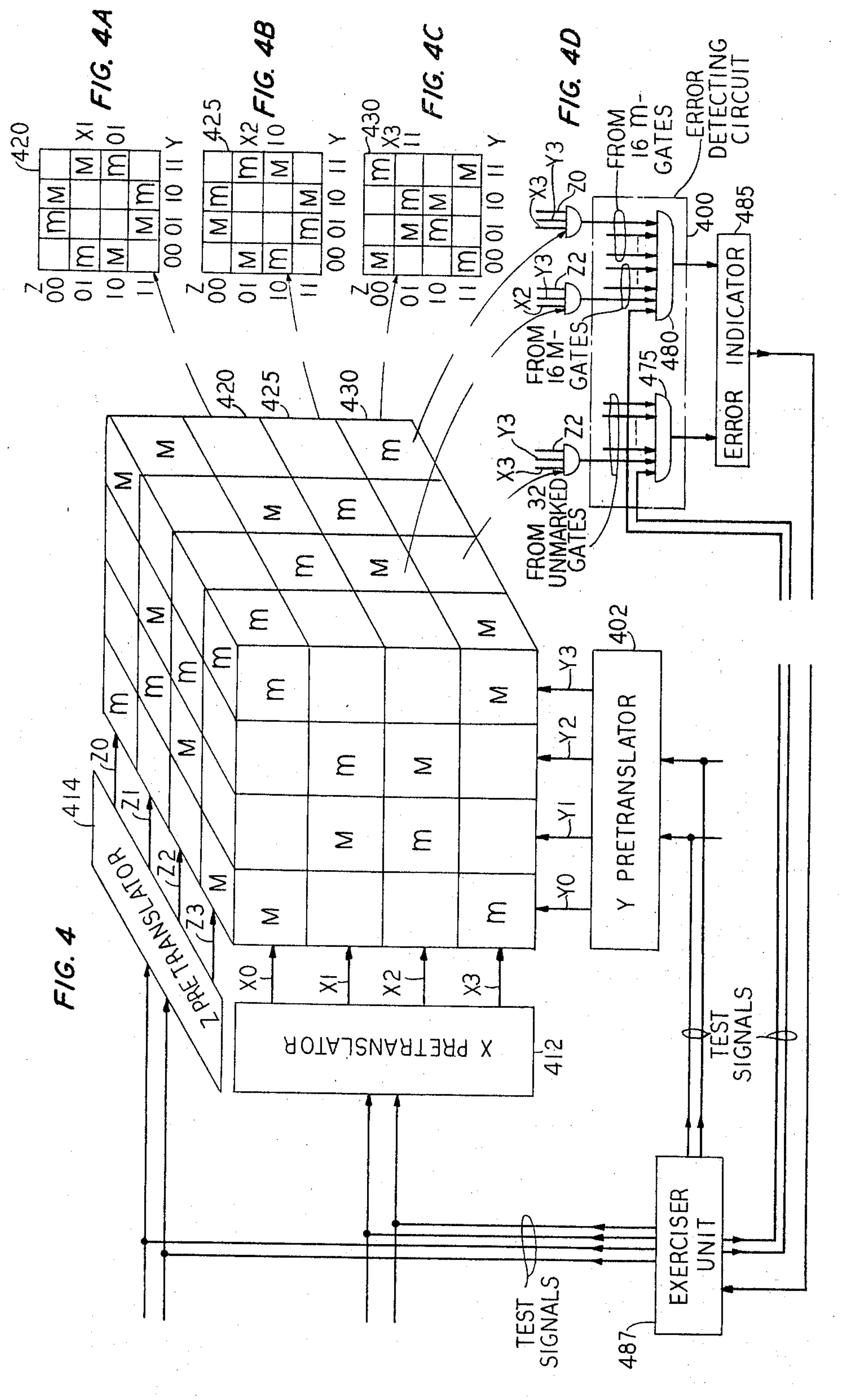

An error-detecting circuit made in accordance with the principles of the present invention may also be combined with three-dimensional translation arrays such as, for example, the cubic array schematically illustrated in FIG. 4. The over-all array of FIG. 4 is depicted as being composed of 64 component cubes each of which is representative of a 3-input crosspoint unit of the general type shown in FIG. 1. Connected to selected ones of the crosspoint units are three pretranslators, a Y pretranslator 402, and X pretranslator 412 and a Z pretranslator 414, each of these pretranslators being adapted to convert a 2-digit binary input signal into a one-out-of-four output representation. The output leads emanating from the Y pretranslator 402 are designated Y0, Y1, Y2 and Y3. Those stemming from the X pretranslator 412 are marked X0, X1, X2 and X3, and those from the Z pretranslator 414 are Z0, Z1, Z2 and Z3.

FIG. 4 is intended to indicate that one input terminal of every one of a first group of 16 crosspoint units disposed in a first or front-most plane parallel to the plane of the drawing is connected to the Z3 lead of the pretranslator 414. A second plane parallel and adjacent to the first-mentioned plane contains 16 crosspoint units, one input terminal of each of which is connected to the Z2 lead. Similarly, a third plane parallel and adjacent to the second-mentioned one contains 16 crosspoint units, one input terminal of each of which is connected to the Z1 lead. Further, a fourth or back-most plane parallel and adjacent to the third-mentioned one contains 16 crosspoint units connected to the lead Z0.

Additionally, an input terminal of every one of the crosspoint units disposed in a top-most substantially horizontal plane is connected to the lead X0 of the pretranslator 412 shown in FIG. 4. The next downward and adjacent planar group of crosspoint units is connected to the lead X1. In a similar manner the leads X2 and X3 are respectively connected to the bottom two substantially horizontal planar groups of crosspoint units.

Furthermore, each of the leads designated Y0, Y1, Y2, and Y3 in FIG. 4 is respectively connected to an input terminal of every one of the crosspoint units included in an associated vertical planar group positioned immediately above the corresponding pretranslator output lead. For example, the output leads of the 16 crosspoint units included in the left-most vertical plane generally perpendicular to the plane of the drawing are each connected to the Y0 lead.

Illustratively, the binary to one-out-of-four Y pretranslator 402 shown in FIG. 4 is arranged to respond to the input representations 00, 01, 10 and 11 to select the output leads Y0, Y1, Y2, and Y3, respectively. Similarly, the X pretranslator 412 responds to the input signals 00, 01, 10 and 11 to ground the leads X0, X1, X2, and X3, respectively, and the X pretranslator 414 responds to the application thereto of the representations 00, 01, 10 and 11 to energize the leads Z0, Z1, Z2, and Z3, respectively. Thus, each of the 64 crosspoint units represented in FIG. 4 has in effect associated therewith a unique 6-digit binary number. Application of this number to the pretranslators 402, 412 and 414 results in the associated crosspoint unit providing a positive output signal. In this way binary to one-out-of 64 translation is effected.

In accordance with the principles of the present invention, the output leads of those crosspoint units of FIG. 4 which are selected by 6-digit binary representations that include an even number of "1" indications are connected to a gate unit 480 included in an error-detecting circuit 400 shown in FIG. 4D. There are 32 such units and each is designated in FIG. 4 by an *m* or an M. Each of the other or unmarked crosspoint gate units of FIG. 4 is selected in response to a binary number having an odd number of "1" indications therein. The output leads of these 32 unmarked units are connected to a second error-detecting gate 475 in the circuit 400 of FIG. 4D.

The detailed arrangement of the crosspoint units in the bottom three substantially horizontal planar groups (designated 420, 425, and 430 in FIG. 4) is shown in FIGS. 4A through 4C, respectively, to the right of the cubic array shown in FIG. 4. In this way every one of the 64 crosspoint units in the array is clearly designated and easily identifiable.

Assuming that each of the Y, X, and Z pretranslators 402, 412, and 414 shown in FIG. 4 is of the type shown in FIG. 2A, the capabilities of the FIG. 4D circuitry extend to detecting any single fault occurrence in the two-input gates of the pretranslator units. This capability exists during actual operation of the array and is the same as that described above in connection with FIGS. 2A and 3A. In addition, many errors which arise from input faults in the crosspoint units of FIG. 4 are detected during actual operation by the circuitry illustrated in FIG. 4D. For example, an erroneous simultaneous energization of an *m*- or M-designated crosspoint unit and an unmarked unit causes both of the error-detecting gates 475 and 480 of FIG. 4D to apply near-ground signals to the error unit 485, thereby to indicate the occurrence of a multiple output from the cubic array shown in FIG. 4.

However, some fault conditions in the crosspoint units of FIG. 4 go undetected during actual operation of the array. For instance, double outputs from two unmarked crosspoint units or from two *m*- or M-designated units cause the error-detecting gates 475 and 480 of FIG. 4D to provide dissimilar outputs, which is not indicative of a fault occurrence.

To completely test the crosspoint units shown in FIG. 4 for faults, it is advantageous periodically to check their condition during a test cycle of operation. This testing may be carried out by an exereciser unit 487 which is adapted to apply a predetermined set of test input signals to the Y, X, and Z pretranslators 402, 412, and 414. These test signals are selected to sequentially energize the set of 16 M-designated crosspoint units which are representative of every row and column of the array. Then additional test signals are applied to the array from the exerciser unit 487 to sequentially energize the set of 16 *m*-designated crosspoint units, which are also representative of every row and column of the array. In accordance with this test procedure a complete check of the crosspoint gate units shown in FIG. 4 is performed. Any double outputs therefrom are detected by the circuit 400 and indicated by the unit 485 of FIG. 4D.

Also, periodic testing of the error-detecting circuit 400 of FIG. 4D to ensure correct operation thereof is considered advantageous. For this purpose an extra input terminal is added to each of the gate units 475 and 480. As shown in FIGS. 4 and 4D, these terminals are connected to the exerciser unit 487 which is adapted to apply test signals to the units 475 and 480 and to monitor the resulting output condition of the error indicator 485, thereby to test the error-detecting portion of the illustrated arrangement for proper response to single and multiple input signals applied thereto.

In accordance with the principles of this invention, the cubic array shown in FIG. 4 can easily be modified to receive two-rail binary inputs directly from six associated flip-flops. In such a pretranslator-less modification, each crosspoint unit has six input terminals and a single output terminal. The capabilities of such a modification extend to detecting all double output occurrences from the crosspoint units during actual operation thereof. No separate test cycle of operation is required to perfrom a complete check on the condition of the 64 crosspoint units.

Thus, in accordance with the principles of the present invention there have been described herein various error control circuits for detecting in a relatively simple and reliable manner erroneous output signal conditions which occur in binary to one-out-of-N translators.

It is noted that copending applications Ser. Nos. 387,644 and 387,645, both filed Aug. 5, 1964, now Patents 3,371,315 and 3,381,270, issued Feb. 27, 1968 and Apr. 30, 1968, are directed to subject matter related to that described herein.

It is to be understood that the above-described arrangements are only illustrative of the application of the principles of the present invention. In accordance with these principles, numerous other arrangements may be devised by those skilled in the art without departing from the spirit and scope of the invention. For example, although the present invention has been illustratively described as applied to TRL circuitry, it is emphasized that the principles of this invention are applicable to logic technologies other than TRL.

Additionally, although emphasis herein has been directed for illustrative purposes to detecting the occurrence of several specific types of faults in translating equipment, it is to be understood that the principles of this invention are applicable to the detection of still other types. For example, a crosspoint unit in the translating equipment may fail in a manner such that its output lead remains always at a positive potential. The error-detecting circuitry described herein is well suited to detect such faults, as well as other types not specifically described.

Moreover, it may, under certain operating conditions, be desirable not to apply any positive output signals from the crosspoint units of FIGS. 2A, 3A, and 4 to the associated utilization circuitry during the aforedescribed sequential test cycles of operating thereof. For this purpose, additional individual leads (not shown) may extend from the associated exerciser units 287, 387, and 487 to the respective sequentially-energized crosspoint units to apply inhibiting (or positive) input signals thereto during sequential test energization of these units by the exercisers.

Alternatively, selected ones of the crosspoint units of translation arrays of the general type shown in FIGS. 2A, 3A, and 4 may be reserved solely for test purposes, with no output leads extending from the reserved units to the associated utilization circuitry. In such cases, no inhibiting signals from the associated exerciser units are necessary during the sequential test energization thereof to avoid supplying positive output signals to the utilization circuitry.

What is claimed is:

1. In combination in an error-detecting circuit that is adapted to be interconnected with a matrix array of $2^{2n}$ crosspoint gate units each of which is selected in response to a unique $2n$-digit binary representation applied to said array, a first error-detecting gate unit connected to all those crosspoint gate units which are respectively selected by binary representations that include an even number of "1" signal indications, a second error-detecting gate unit connected to all those crosspoint gate units which are respectively selected by binary representations that include an odd number of "1" signal indications, means connected to said error-detecting gate units for indicating the energization condition thereof, and means for applying test signals to said error-detecting gates and for monitoring the resulting condition of said indicating means.

2. In combination in an error-detecting circuit that is adapted to be interconnected with a binary to one-out-of-$2^{2n}$ translation array of $2^{2n}$ crosspoint units each of which includes an output terminal, each of said crosspoint units being uniquely selected by the application to said array of a distinct $2n$-digit input binary representation, an error-detecting circuit including first and second gates each having a plurality of input terminals, means respectively connecting the input terminals of said first gate to the output terminals of those crosspoint units that are selected by input representations that include an even number of "1" signal indications therein, means respectively connecting the input terminals of said second gate to the output terminals of those crosspoint units that are selected by input representations that include an odd number of "1" signal indications therein, an error indicator responsive to the output conditions of said first and second gates, and an exerciser unit for applying test signals to said first and second gates, and means connecting said error indicator to said exerciser unit.

3. A combination as in claim 2 wherein said exerciser unit is adapted to generate $2n$-digit test signals for application to said array, and means connecting said exerciser unit to said array for applying said test signals thereto.

4. In combination, an X pretranslator having $2^n$ output conductors, a Y pretranslator having $2^n$ output conductors disposed with respect to said first-mentioned output conductors to define a square matrix array of $2^{2n}$ intersections, $2^{2n}$ crosspoint gate units each having an output terminal and further having two input terminals respectively connected to the conductors defining a different one of said intersections, means for applying a $2n$-digit binary number to said X and Y pretranslators for activating a single one of the output conductors emanating from each of said pretranslators, a first error-detecting gate unit connected to the output terminals of those crosspoint units that are selected in response to applied binary numbers that include an even number of "1" indications therein, a second error-detecting gate unit connected to the output terminals of those crosspoint units that are selected in response to applied binary numbers that include an odd number of "1" indications therein, an error unit connected to said first and second error-detecting gate units for indicating the energization condition thereof, and an exerciser unit for applying test signals to said first and second error-detecting gate units and for monitoring the response of said first and second units and said error unit to said test signals.

5. A combination as in claim 4 still further including means connected to said exerciser unit for applying test signal sequences to said X and Y pretranslators for checking the condition of said crosspoint gate units.

6. In combination, a matrix array of crosspoint gate units, flip-flop means connected to said crosspoint units and responsive to applied binary representations for selecting respective ones of said crosspoint units, a first error-detecting gate unit connected to those crosspoint units that are selected in response to binary representations that include an even number of "1" indications, a second error-detecting gate unit connected to those crosspoint units that are selected in response to binary representations that include an odd number of "1" indications, an error indicator connected to said first and second gate units for indicating the energization conditions thereof, and an exerciser unit for applying test signals to said first and second gate units and for monitoring the resulting condition of said error indicator.

7. In combination in an error-detecting circuit adapted to be interconnected with a cubic matrix array of crosspoint units for detecting the occurrence of multiple output signals from said units, each of said units being selected by the application to said array of a distinct input binary representation, a first error-detecting gate unit connected to all those crosspoint units of the array that are selected in response to binary representations that include an even number of "1" signal indications, a second error-detecting gate unit connected to all those crosspoint units of the array that are selected in response to binary representations that include an odd number of "1" signal indications, an an error unit responsive to the output conditions of said first and second gate units for indicating the error condition of said array.

8. A combination as in claim 7 further including an exerciser unit for applying test input signals to said array to sequentially energize selected ones of said crosspoint units.

References Cited

UNITED STATES PATENTS

| | | | |
|---|---|---|---|
| 2,904,781 | 9/1958 | Katz | 340—146.1 X |
| 2,958,072 | 10/1960 | Batley | 340—146.1 X |
| 3,221,310 | 11/1965 | Reach | 340—146.1 X |

MALCOLM A. MORRISON, *Primary Examiner.*

CHARLES E. ATKINSON, *Assistant Examiner.*

U.S. Cl. X.R.

235—153; 340—347